United States Patent [19]

Reichl

[11] Patent Number: 4,491,928
[45] Date of Patent: Jan. 1, 1985

[54] REFERENCE MARK DESIGNATING SYSTEM FOR INCREMENTAL POSITION MEASURING INSTRUMENTS

[75] Inventor: Alfred Reichl, Stein, Fed. Rep. of Germany

[73] Assignee: Dr. Johannes Heidenhain GmbH, Traunreut, Fed. Rep. of Germany

[21] Appl. No.: 304,083

[22] Filed: Sep. 21, 1981

[30] Foreign Application Priority Data

Oct. 18, 1980 [DE] Fed. Rep. of Germany ....... 3039483

[51] Int. Cl.³ .............................................. H01J 3/14
[52] U.S. Cl. .................................. 364/562; 250/237 G
[58] Field of Search ....................... 364/562, 561, 560; 235/466, 463; 318/467; 340/825.22, 825.23; 356/374, 395; 250/237 G, 237 R

[56] References Cited

U.S. PATENT DOCUMENTS

| | | | |
|---|---|---|---|
| 3,261,967 | 7/1966 | Rosin et al. | 364/560 |
| 3,676,652 | 7/1972 | Millis, Jr. et al. | 364/562 |
| 3,681,582 | 8/1972 | Kimio et al. | 364/560 |
| 3,838,251 | 9/1974 | Herrin | 235/463 |
| 3,882,301 | 5/1975 | Nassimbene | 235/466 |
| 3,982,106 | 9/1976 | Stutz | 235/92 GC |
| 4,044,227 | 8/1977 | Holm et al. | 235/465 |
| 4,086,478 | 4/1978 | Okano | 235/466 |
| 4,101,764 | 7/1978 | Nelle | 250/237 G |
| 4,158,229 | 6/1979 | Woo, Jr. et al. | 364/562 |
| 4,158,509 | 6/1979 | Rieder et al. | 356/395 |
| 4,250,554 | 2/1981 | Blum et al. | 364/562 |
| 4,363,964 | 12/1982 | Schmitt | 250/237 G |
| 4,385,836 | 5/1983 | Schmitt | 356/374 |
| 4,400,890 | 8/1983 | Ohkubo et al. | 33/125 C |
| 4,403,859 | 9/1983 | Ernst | 356/374 |

FOREIGN PATENT DOCUMENTS 2540412 8/1979 Fed. Rep. of Germany.

Primary Examiner—Eddie P. Chan
Assistant Examiner—T. A. Wiens
Attorney, Agent, or Firm—Willian, Brinks, Olds, Hofer, Gilson & Lione Ltd.

[57] ABSTRACT

A position measuring instrument of the type having a scale and a scanning unit is provided with a plurality of reference marks on the scale. An identification mark is associated with each reference mark, and each identification mark is uniquely coded. The scanning unit operates to read the identification marks and to generate identification signals which are applied to a comparator or to a computer. The comparator or computer compares the identification signal corresponding to each reference mark with a set of designation signals. Only if a correspondence is found between the identification signal and one of the designation signals is the reference mark allowed to go into operation. Thus, by merely changing the designation signals electronically, any desired subset of a total number of reference marks can be enabled. The selected reference marks can readily be changed electronically without physical manipulation of the measuring instrument.

10 Claims, 4 Drawing Figures

REFERENCE MARK DESIGNATING SYSTEM FOR INCREMENTAL POSITION MEASURING INSTRUMENTS

BACKGROUND OF THE INVENTION

This invention relates to a process for the selection of reference marks in incremental length or angle measuring instruments, as well as to devices for the execution of this process.

In West German DE-AS 25 40 412, a system is described which includes a scale having an incremental division as well as a series of reference marks spaced along the division at fixed positions. Switching means are arranged on the scale or in the immediate vicinity of the scale in order to select and bring into operation certain selected ones of these reference marks. The disclosed switching means includes magnets and correspondingly positioned reed switches. As disclosed in this application, the magnets are used to identify selected ones of the reference marks to be put into operation, and the magnets must be physically shifted along the scale in order to position a magnet adjacent to each selected reference mark. When reference marks are selected in this manner, any one of a wide range of control processes in the incremental position measuring instrument can be triggered by means of the selected reference marks.

In addition, documents such as West German De-PS 24 16 212 and West German DE-OS 24 18 909 describe arrangements for the evaluation of each of a series of coded reference marks, each of which is allocated to a fixed position with respect to the scale. These positions are encoded on the reference marks as identification features. The reference marks are read during the measuring process and the counter state of the instrument is set, if need be, to the numerical value of the position associated with each respective reference mark as that reference mark is read.

SUMMARY OF THE INVENTION

This invention is directed to further improvements in processes and devices for the selection of reference marks in incremental measuring instruments, and in particular to such improvements as render the selection of designated reference marks simpler, more accurate and more certain.

According to this invention, an incremental measuring instrument of the type having a plurality of reference marks, means for detecting the reference marks and generating a plurality of reference pulses in response thereto, and means, responsive to the reference pulses, for controlling the instrument is provided with a plurality of identification marks, each of which is associated with a respective one of the reference marks. Means are provided for detecting the plurality of identification marks and for generating a plurality of identification signals in response thereto, each of the identification signals being indicative of a respective one of the identification marks. Data storage means are provided for storing a set of designation signals indicative of a designated set of the reference marks. In addition, means are provided for comparing each of the identification signals with the set of designation signals, and for generating a gating signal as a function of the result of the comparison. The gating signal is applied to means for gating each of the reference pulses in response to the respective gating signal, such that for at least one state of the gating signal the reference pulses are prevented from acting on the controlling means.

The advantages of this invention lie particularly in the fact that individual reference marks can be designated electronically from a control panel, and no mechanical manipulations are required on the measuring instrument itself in order to alter the reference mark designation. The necessary identification marks can be applied adjacent to the reference marks without any great increase in cost. This is because the identification marks can be formed at the same time and in the same manner as that used to produce the division on the scale and the reference marks themselves. Furthermore, since modern measuring instruments in general include a microcomputer, associated memory, and control panels in the evaluating arrangement, the electronic components required to implement this invention also hardly require any additional expenditure.

The method and apparatus of this invention is further defined in the dependent claims which follow. The invention itself, together with further objects and attendant advantages, will best be understood by reference to the following detailed description taken in connection with the accompanying drawings.

DETAILED DESCRIPTION OF THE PRESENTLY PREFERRED EMBODIMENTS

Figure 1:
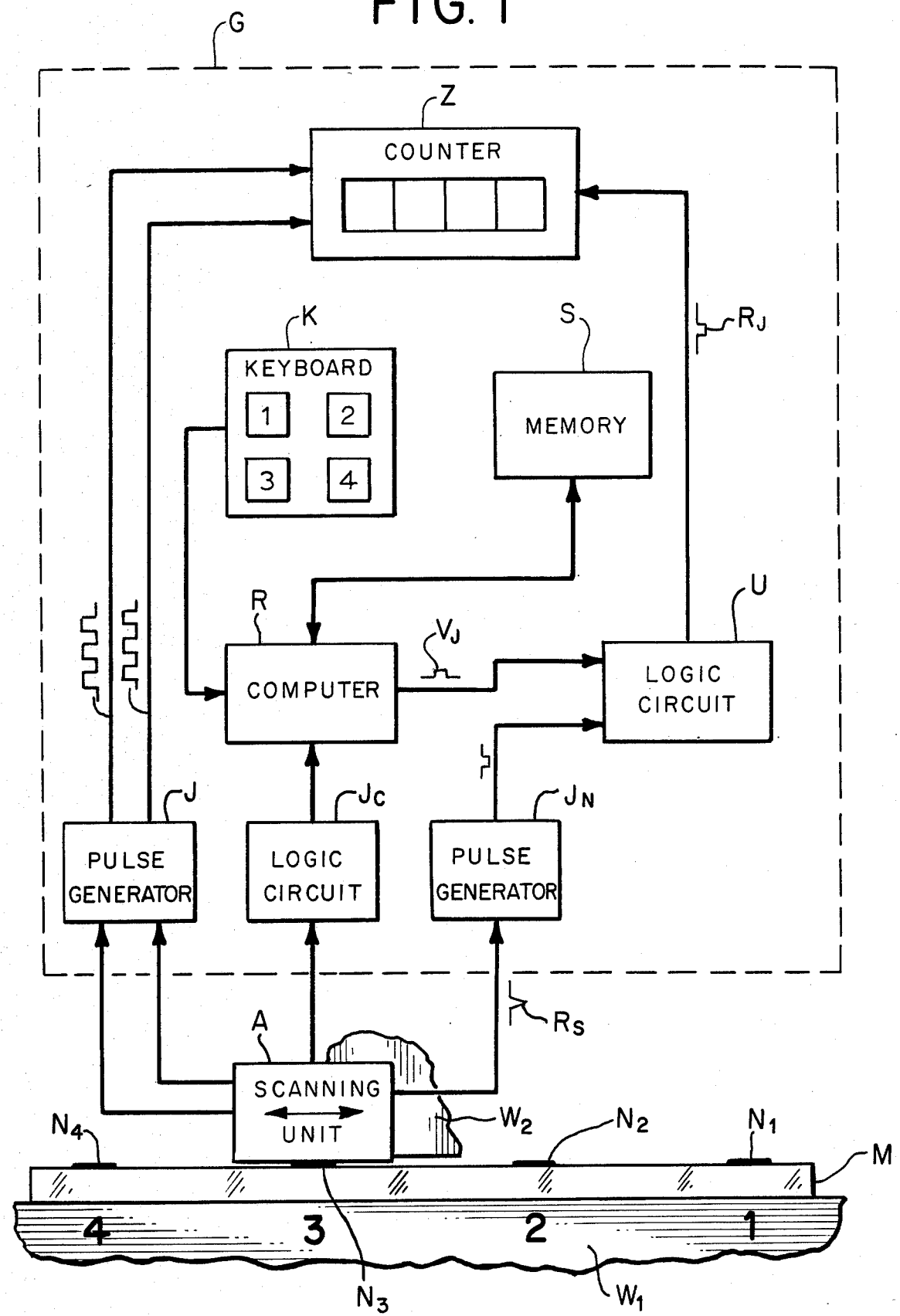
FIG. 1 is a schematic representation of a first preferred embodiment of the apparatus of this invention.
Figure 3:
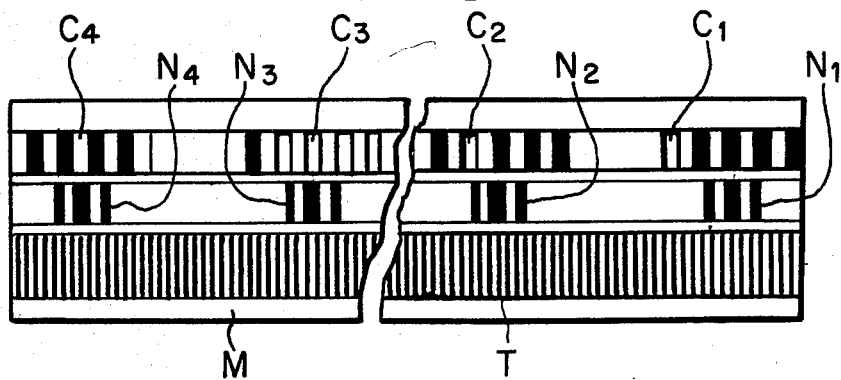
FIG. 3 shows a plan view of a measuring scale suited for use in the embodiments of FIGS. 1 and 2.
Figure 4:
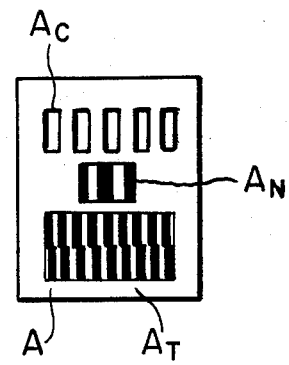
FIG. 4 shows a plan view of a scanning reticle suitable for use in the embodiments of FIGS. 1 and 2.

Turning now to the drawings, FIG. 1 represents a first preferred embodiment of the apparatus of this invention. This embodiment includes a measuring scale M that is fixedly mounted on the bed $W_1$ of a machine tool. A scanning unit A is mounted on the slide piece $W_2$ of the machine tool such that relative movement between the bed $W_1$ and the slide piece $W_2$ causes the scanning unit A to move along the measuring scale M and to scan the markings applied to the measuring scale M. The markings on the scale M are shown in FIG. 3 and the markings on the reticle of the scanning unit A are shown in FIG. 4. In FIG. 3, the reference numeral T is used to designate the grid scale of the scale M, which is read off in a known manner by the scanning unit A by means of the scanning field $A_T$. The scanning field $A_T$ consists of two partial fields, which are offset with respect to one another by one-quarter of the division period. In this way, two scanning signals are generated in reading the division T on the scale M. These two scanning signals are phase displaced with respect to one another by 90°, thereby enabling direction discrimination with respect to relative movement of the two components $W_1$ and $W_2$. In addition to the incremental division T, the measuring scale M also defines a series of reference marks $N_1$, $N_2$, $N_3$, and $N_4$, the positions of which are fixed on the scale M. Each of these reference marks is provided with a respective coded marking $C_1$, $C_2$, $C_3$, $C_4$, which serves as identification marks. In the example FIG. 3, the identification marks code the numbers 1, 2, 3, and 4 respectively. Thus, each identification mark is unique and each unambiguously identifies the respective reference mark $N_{1...4}$. In the reticle of the scanning unit A, there is also provided in addition to the scanning field $A_T$ for the division T, also scanning fields $A_N$ and $A_C$ which scan in each case the reference mark track and the identification mark track, respectively.

In the event of relative movement between the machine components $W_1$ and $W_2$, the scanning unit A generates measuring signals that are applied to a pulse-generating circuit J. The pulse-generating circuit J serves to generate pulses which drive an up-down counter Z, which displays a number indicative of the position of the first component $W_1$ with respect to the second component $W_2$. Furthermore, when the scanning unit travels over one of the reference marks $N_{1...4}$, the scanning unit A generates a reference pulse $R_S$. This reference pulse $R_S$ is applied to an additional pulse-generating circuit $J_N$, and the output of the pulse-generating circuit $J_N$ is applied to an input of an electronic gating circuit U.

In addition, when the scanning field $A_C$ scans the identification marks $C_{1...4}$, associated with the reference marks $N_{1...4}$, respectively, the information obtained from the identification marks $C_{1...4}$ is passed on to a logic circuit $J_C$. The logic circuit $J_C$ converts this information into data suitable for entry into a digital computer R. The embodiment of FIG. 1 also includes a keyboard K which is coupled to the digital computer R. The computer R is programmed such that the keyboard K can be used to enter information in the form of digital designation signals into an electronic digital memory S. The designation signals stored in the memory S correspond to the information content of selected ones of the identification marks $C_{1...n}$ associated with those reference marks $N_{1...4}$ that are to be selected from the complete set of reference marks $N_{1...4}$.

The digital computer R is programmed in such a way that it compares each identification signal obtained by scanning the identification marks $C_{1...4}$ with the designation signals stored in the memory S. Since the designation signals stored in the memory S correspond only to the selected set of the designated reference marks $N_{1...4}$, only selected ones of the identification signals find a correspondence with the designation signals stored in the memory S. When the computer determines that an identification signal corresponds to one of the designation signals stored in the memory S, the digital computer R is programmed to generate a gating signal $V_J$ which is applied as an input into the gating circuit U.

The electronic gating circuit U can be a logic circuit, for example, an "AND" gate. The gating circuit U is arranged such that it generates a reference pulse $R_J$, which is applied to the counter Z, only if signals are applied simultaneously to both inputs of the gating circuit U.

Thus, the reference pulse $R_J$ is applied to the counter Z only when two conditions are met: (1) the pulse-generating circuit $J_N$ must generate a pulse in response to the detection of one of the reference marks $N_{1...4}$, and (2) the computer R must simultaneously supply a gating pulse $V_J$ to the gating circuit U indicative of the fact that the identification signal corresponding to the respective identification mark corresponds to one of the stored designation signals in the memory S. Both the gating signal $V_J$ and the pulse generated by the pulse-generating circuit $J_N$ must be applied simultaneously to the gating circuit U in order for a pulse $R_J$ to be passed to the counter Z.

The embodiment of FIG. 1 provides the important advantage that by simply using the selection keyboard K to alter the contents of the memory S, any desired set of the reference marks $N_{1...4}$, can be selected from the total series of reference marks such that only the selected reference marks are applied to the counter Z.

It should be understood that the embodiment of FIG. 1 can be arranged such that reference pulses operate on the counter Z only if the counter R fails to find a correspondence between the designation signals in the memory S and an identification signal. This alternate approach may be advantageous in situations where, for example, a great many of the total number of reference marks are to be selected. In this case, the only designation signals stored in the memory S correspond to the identification signals of the undesired reference marks. In this alternate arrangement, reference pulses are suppressed only when the computer finds a correspondence between the respective identification signal and one of the designation signals stored in the memory S. All reference pulses corresponding to identification signals which find no correspondent with designation signals stored in the memory S go into operation.

Figure 2:
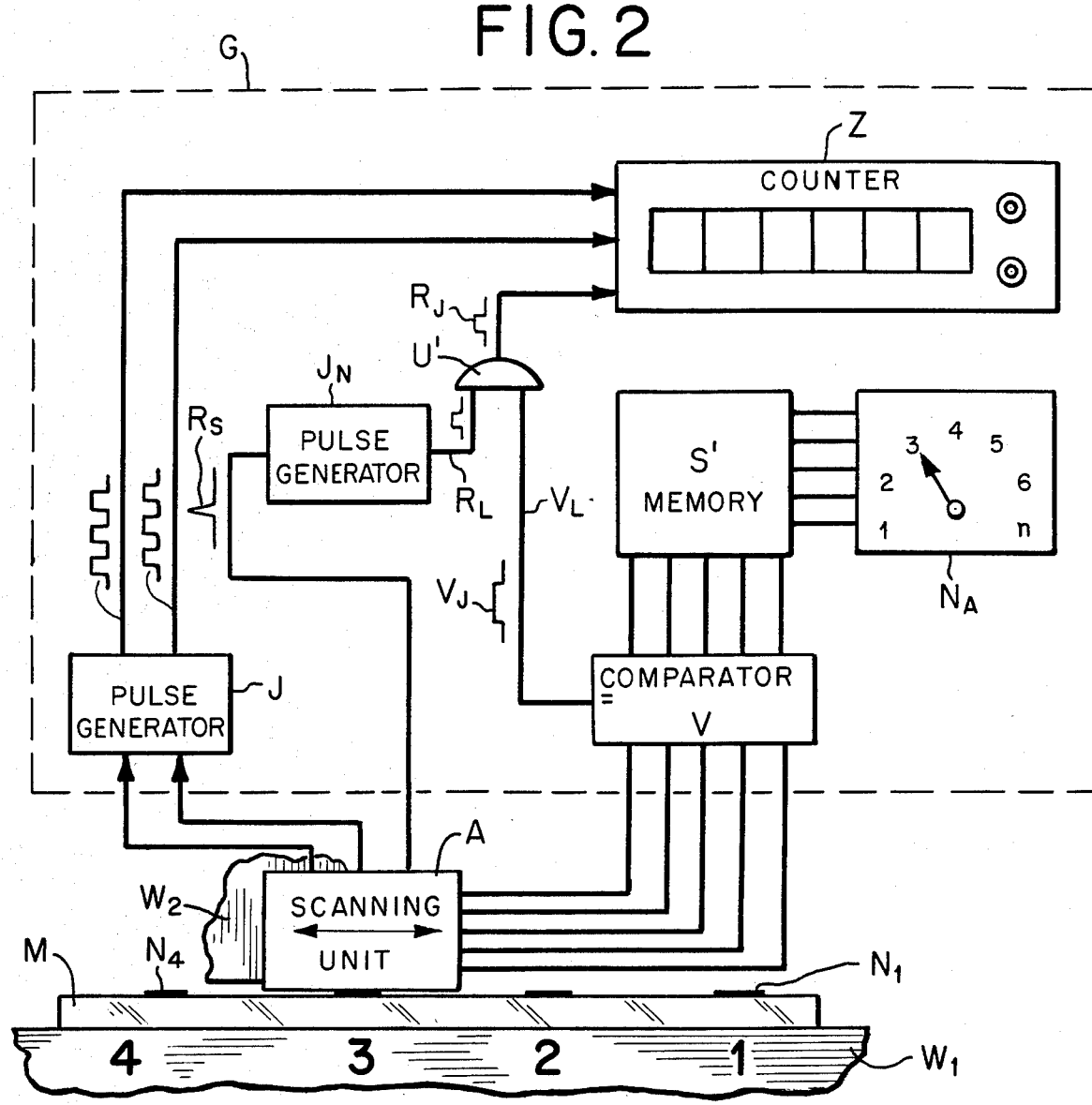
FIG. 2 is a schematic representation of a second preferred embodiment of the apparatus of this invention.

A second preferred embodiment of the present invention is shown in FIG. 2. In the embodiment of FIG. 2, the scanning field $A_C$ scans the identification marks $C_{1...4}$ allocated to the reference marks $N_{1...4}$. The resulting information is applied to a comparator V, for example, in the form of a set of parallel binary signals.

The comparator V also defines additional inputs which are connected to an electronic memory S', which can, for example, be a Random Access Memory. The memory S' contains designation signals corresponding to the identification signals of the identification marks $C_{1...4}$, stored in each case as a combination of binary signals. A selection device $N_A$ is connected to this memory S' such that one or more identification marks $C_{1...4}$ (and therefore one or more of the reference marks $N_{1...4}$) can be selectively enabled. The selection device $N_A$ can, for example, be a rotary switch or a keyboard. If a coding switch is used as the selection device $N_A$, then the electronic memory S' can be dispensed with, since the coding of the identification marks $C_{1...4}$ and the code of the coding switch agree.

If, for example, the reference mark $N_3$ is to be selected, then the selection device $N_A$ is positioned such that the memory S' applies a designation signal corresponding to the identification signal $C_3$ for the reference mark $N_3$ to the comparator V. If the scanning unit A is moved across the incremental division T, when the scanning field $A_N$ moves over the reference mark $N_3$ a reference pulse $R_S$ is generated and applied in the manner described above to the input of a pulse-generator $J_N$. Simultaneously, the coded identification mark $C_3$ is scanned and the binary identification signal corresponding to $C_3$ is applied by means of the illustrated conductors to the comparator V. The comparator V compares this identification signal with the designation signal, and in the event of equality, generates a gating pulse $V_J$ which is applied to a second input of the gating circuit U'.

Only when the reference pulse $R_S$, corresponding to the reference mark $N_3$, and the gating pulse $V_J$ are simultaneously applied to the gating circuit U' (by reason of the positive result of the comparison between the identification signal and the designation signal by the comparator) does the gating circuit U' generate a reference pulse $R_J$ which is applied to the counter Z. The reference pulse $R_J$ can be used to trigger any desired control command. For example, the reference pulse $R_J$ can be used to set the up-down counter Z to the value zero. When the scanning unit A scans reference marks other than those corresponding to designation signals supplied by the memory S' to the comparator V, the comparator V cannot deliver any pulse $V_J$, since there is no co-incidence between the identification signal and the designation signal.

A particularly simple and reliable selection of reference marks $N_{1...4}$ from the series of reference marks can be insured with the embodiments described above if the approximate positions of each of the reference marks $N_{1...4}$ is marked on the bed $W_1$ of the machine tool, and the respective reference marks $N_{1...4}$ are correspondingly numbered. In the embodiments of FIGS. 1 and 2, decimal digit markings 1, 2, 3, and 4 are applied to the bed $W_1$ of the machine tool adjacent to the corresponding reference marks $N_{1...4}$, such that in each case the decimal digit marking corresponds to the identification signal of the respective identification mark. Preferably, these decimal digit markings are large enough such that the operator can recognize them even from a relatively great distance. In like manner, the keyboard K and the selection device $N_A$ are marked with corresponding decimal digits 1, 2, 3, 4, and the like. In this way, the operator can readily determine the manner in which the keyboard K or the selection device $N_A$ is to be manipulated in order to designate any desired set of reference marks $N_{1...4}$.

The reference marks can also be characterized by means of their position. Thus, for example, the reference mark that is applied 300 millimeters from the zero point of the measuring instrument can carry the decimal digit mark 300, and the keyboard or the selection device $N_A$ can be labelled correspondingly. Preferably, the identification signal corresponding to the identification mark for this reference mark is the number 300 in binary coded form.

It should be understood that it is also possible to characterize both the reference marks and the labelling on the keyboard K or the selection device $N_A$ by color coded markings. Furthermore, the display of identification signals corresponding to the reference marks can take place by means of alphanumerical displays included in the up-down counter Z. Preferably, the embodiments described above are enclosed in a casing G on a control panel of the machine tool so that the operation of the reference mark selection device is possible in a convenient manner for the operator. The control panel can also be a component of a numerical control.

Of course, it should be understood that various changes and modifications to the preferred embodiments as described above will be apparent to those skilled in the art. It is therefore intended that the foregoing detailed description be regarded merely as illustrative of the presently preferred embodiments, and not as limiting the scope of the invention. It is the following claims, including all equivalents, which are intended to define the scope of this invention.

I claim:

1. In an incremental position measuring instrument comprising a grid scale, a plurality of identical reference marks arranged along the grid scale, each positioned at a predetermined absolute position with respect to the grid scale; means for detecting the reference marks and generating a plurality of reference signals in response thereto; and means, responsive to the reference signals for controlling the instrument; the improvement comprising:

means for defining a plurality of distinct identification marks, each associated with a respective one of the reference marks and each different from the other identification marks;

means for detecting the plurality of identification marks and for generating a plurality of identification signals in response thereto, each of the identification signals indicative of a respective one of the identification marks;

data storage means for storing a set of designation signals indicative of a designated set of the reference marks;

means for comparing each of the identification signals with the set of designation signals and for generating a gating signal as a function of the result of the comparison; and means for selectively gating each of the reference signals in response to the respective gating signal, such that for at least one state of the gating signal the reference signals are prevented from acting on the controlling means.

2. The invention of claim 1 wherein the comparing means comprises a digital computer and the storage means comprises a digital memory; wherein the storage means further comprises means for selecting the digital designation signals stored in the memory such that the designated set of reference marks can readily be changed; wherein the computer comprises means for generating the gating signal when one of the identification signals corresponds to one of the set of designation signals; wherein the gating means comprises a logic circuit having a first input coupled to the computer to receive the gating signal, a second input coupled to the reference signal generating means to receive the reference signals, and an output connected to the controlling means, said logic circuit acting to transmit one of the reference signals to the controlling means only when the gating signal is applied to the first input and the respective reference signal is applied to the second input simultaneously.

3. The invention of claim 1 wherein the storage means further comprises means for selecting the set of designation signals stored in the storage means in order to select the designated set of reference marks; wherein the comparing means comprises a comparator coupled to the data storage means and the identification signal generating means to generate the gating signal in the event of co-incidence between one of the identification signals and the set of designation signals; and wherein the gating means comprises a logic circuit having a first input coupled to the comparator to receive the gating signal, a second input coupled to the reference signal generating means to receive the reference signals, and an output connected to the controlling means, said logic circuit acting to transmit one of the reference signals to the controlling means only when the gating signal is applied to the first input and the respective one of the reference signals is applied to the second input simultaneously.

4. The invention of claim 1 or 2 or 3 wherein the means for defining a plurality of identification marks comprises a plurality of binary coded marks, each associated with a respective reference mark.

5. The invention of claim 4 further comprising a plurality of decimal digit markings, each arranged in the vicinity of a respective one of the reference marks;

wherein each digit marking is indicative of the identification signal for the respective identification mark; and wherein the selecting means bears decimal digit indicia.

6. The invention of claim 4 wherein each of the identification marks encodes the position of the respective reference mark with respect to a zero point of the measuring instrument; wherein the invention further comprises a plurality of decimal digit markings, each arranged in the vicinity of a respective one of the reference marks; wherein each digit marking is indicative of the position of the respective reference mark with respect to the zero point, and wherein the selecting means bears decimal digit indicia.

7. The invention of claim 4 further comprising a plurality of color coded markings, each arranged in the vicinity of a respective one of the reference marks; and wherein the selecting means bears color coded indicia.

8. The invention of claim 3 wherein the storage means and the selecting means comprises a coding switch.

9. The invention of claim 2 wherein the digital computer comprises a microcomputer.

10. In an incremental measuring apparatus comprising a grid scale, a plurality of identical reference marks positioned along the grid scale, each positioned at a predetermined absolute position with respect to the grid scale, means for detecting the plurality of reference marks and generating a plurality of reference signals in response thereto, and means, responsive to the reference signals, for controlling the instrument, the improvement comprising:

a plurality of distinct identification marks, each different from the others and each associated with a respective one of the reference marks;

a scanning device positioned to scan the identification signals and to generate identification signals in response thereto;

a storage device which stores designation signals indicative of previously selected reference marks;

a comparator coupled to the scanning device and the storage device, which operates to generate a gating signal in response to a comparison between the designation signals and the identification signals;

a gate coupled between the reference signal generating means and the controlling means and responsive to the gating signal such that the gate passes selected ones of the reference signals to the controlling means and prevents selected other ones of the reference signals from reaching the controlling means in accordance with the gating signal.

* * * * *